United States Patent
Basoglu et al.

(10) Patent No.: US 9,203,700 B2
(45) Date of Patent: Dec. 1, 2015

(54) MONITORING CLIENT INFORMATION IN A SHARED ENVIRONMENT

(71) Applicant: International Business Machines Corporation, Armonk, NY (US)

(72) Inventors: Toni U. Basoglu, Happy Valley (HK); Heather M. Hinton, Austin, TX (US); Neil I. Readshaw, Parkwood (AU)

(73) Assignee: International Business Machines Corporation, Armonk, NY (US)

( * ) Notice: Subject to any disclaimer, the term of this patent is extended or adjusted under 35 U.S.C. 154(b) by 193 days.

(21) Appl. No.: 13/898,555

(22) Filed: May 21, 2013

(65) Prior Publication Data

US 2014/0351409 A1 Nov. 27, 2014

(51) Int. Cl.
*G06F 15/173* (2006.01)
*H04L 12/24* (2006.01)

(52) U.S. Cl.
CPC ........ *H04L 41/0869* (2013.01); *H04L 41/0618* (2013.01)

(58) Field of Classification Search
CPC ....... H04L 43/045; H04L 13/12; H04L 41/18; H04L 41/22
USPC .................................................. 709/203, 224
See application file for complete search history.

(56) References Cited

U.S. PATENT DOCUMENTS

| | | | |
|---|---|---|---|
| 7,436,303 B2 | 10/2008 | Tourrilhes et al. | |
| 7,890,869 B1 * | 2/2011 | Mayer et al. | 715/736 |
| 8,171,142 B2 | 5/2012 | Kolin et al. | |
| 2002/0055361 A1 * | 5/2002 | McDonnell et al. | 455/456 |
| 2002/0095487 A1 * | 7/2002 | Day et al. | 709/223 |
| 2008/0079580 A1 * | 4/2008 | Shelton et al. | 340/572.1 |
| 2009/0282141 A1 * | 11/2009 | Hiramatsu et al. | 709/223 |
| 2011/0209146 A1 * | 8/2011 | Box et al. | 718/1 |
| 2011/0289440 A1 | 11/2011 | Carter et al. | |
| 2012/0055985 A1 * | 3/2012 | Allen | 235/375 |
| 2012/0159483 A1 * | 6/2012 | He et al. | 718/1 |

OTHER PUBLICATIONS

"Data Model and Intelligent Engine to Track Virtual Systems and the Associated Physical System and their Location". IP.com PriorArtDatabase. Technical Disclosure. IP.com No. IPCOM000214056D. IP.com Electronic Publication: Jan. 6, 2012.

* cited by examiner

*Primary Examiner* — Duyen Doan
(74) *Attorney, Agent, or Firm* — Maeve McCarthy (57) ABSTRACT

A method for monitoring client information within a shared environment. The method includes identifying a first physical location of a server computer, the server computer providing computing resources to a client within a shared environment, and collecting information associated with the client, the information including computing resources of the server computer provided to the client. The method includes creating a map showing the first physical location of the server computer and the collected information associated with the client. The method includes identifying a current physical location of the server computer and determining whether the current location is different than the first location. The method then, in response to determining the current location is different than the first location, includes updating the map with the identified current physical location of the server computer.

17 Claims, 4 Drawing Sheets

MONITORING CLIENT INFORMATION IN A SHARED ENVIRONMENT

FIELD OF THE INVENTION

The present invention relates generally to the field of shared environments, and more particularly to monitoring client information in a shared environment.

BACKGROUND OF THE INVENTION

Data centers and shared environments, including shared infrastructure and shared data environments, provide cloud computing services, which include the use of hardware and software computing resources delivered virtually as a service over a network, typically the Internet. Cloud computing users access application software and databases through a web browser while the business software and user data are stored on servers at a remote location. Cloud computing providers manage the shared infrastructure and platforms running the applications. Cloud computing relies on sharing of resources and thus some issues with cloud computing include security and privacy concerns, availability of resources and data, and regulations and legal issues.

A key enabling technology for cloud computing is virtualization. Virtualization is a core component to data centers and shared environments and allows a great deal of flexibility in the provisioning and placement of servers and their associated workloads in a data center. In system virtualization, multiple virtual computing systems are created within a single physical server computing system. The physical server can be a stand-alone computer, or alternatively, a computing system utilizing clustered computers and components. Virtual systems are independent operating environments that use virtual resources made up of logical divisions of physical resources such as processors, memory, and input/output (I/O) adapters. System virtualization is implemented through some managing functionality, typically hypervisor technology. Hypervisors, also called virtual machine managers (VMMs), use a thin layer of code in software or firmware to achieve fine-grained, dynamic resource sharing. Hypervisors are the primary technology for system virtualization because they provide the greatest level of flexibility in how virtual resources are defined and managed.

Hypervisors provide the ability to divide physical computing system resources into isolated logical partitions. Logical partitioning is the ability to make a server run as if it were two or more independent servers. Each logical partition operates like an independent computing system running its own operating system (also referred to as a virtual system, virtual server, or virtual machine). Hypervisors can allocate dedicated processors, I/O adapters, and memory to each logical partition and can also allocate shared processors to each logical partition. The hypervisor may also create virtual processors from physical processors so the logical partitions can share the physical processors while running independent operating environments.

In addition to creating and managing the logical partitions, the hypervisor manages communication between the logical partitions via a virtual network. To facilitate communication, each logical partition may have a virtual adapter for communication between the logical partitions, via the virtual network. The type of the virtual adapter depends on the operating system and network protocol used by the logical partition. Examples of virtual adapters include virtual Ethernet adapters, virtual Fibre Channel adapters, virtual Small Computer Serial Interface (SCSI) adapters, and virtual serial adapters.

SUMMARY

Embodiments of the present invention disclose a method, computer program product, and computer system for monitoring client information within a shared environment. The method includes identifying, by one or more computer processors, a first physical location of a server computer, the server computer providing computing resources to a client within a shared environment. The method includes collecting, by the one or more computer processors, information associated with the client, wherein collected information includes computing resources of the server computer provided to the client. The method then includes creating, by the one or more computer processors, a map showing the identified first physical location of the server computer and the collected information associated with the client. The method includes identifying, by the one or more computer processors, a current physical location of the server computer and determining, by the one or more computer processors, whether the current physical location of the server computer is different than the first physical location of the server computer. The method then includes, in response to determining the current physical location of the server computer is different than the first physical location of the server computer, updating, by the one or more computer processors, the map with the identified current physical location of the server computer.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java®, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer-implemented process such that the instructions which execute on the computer or other programmable apparatus provide processes for implementing the functions/acts specified in the flowchart and/or block diagram block or blocks.

Figure 1:
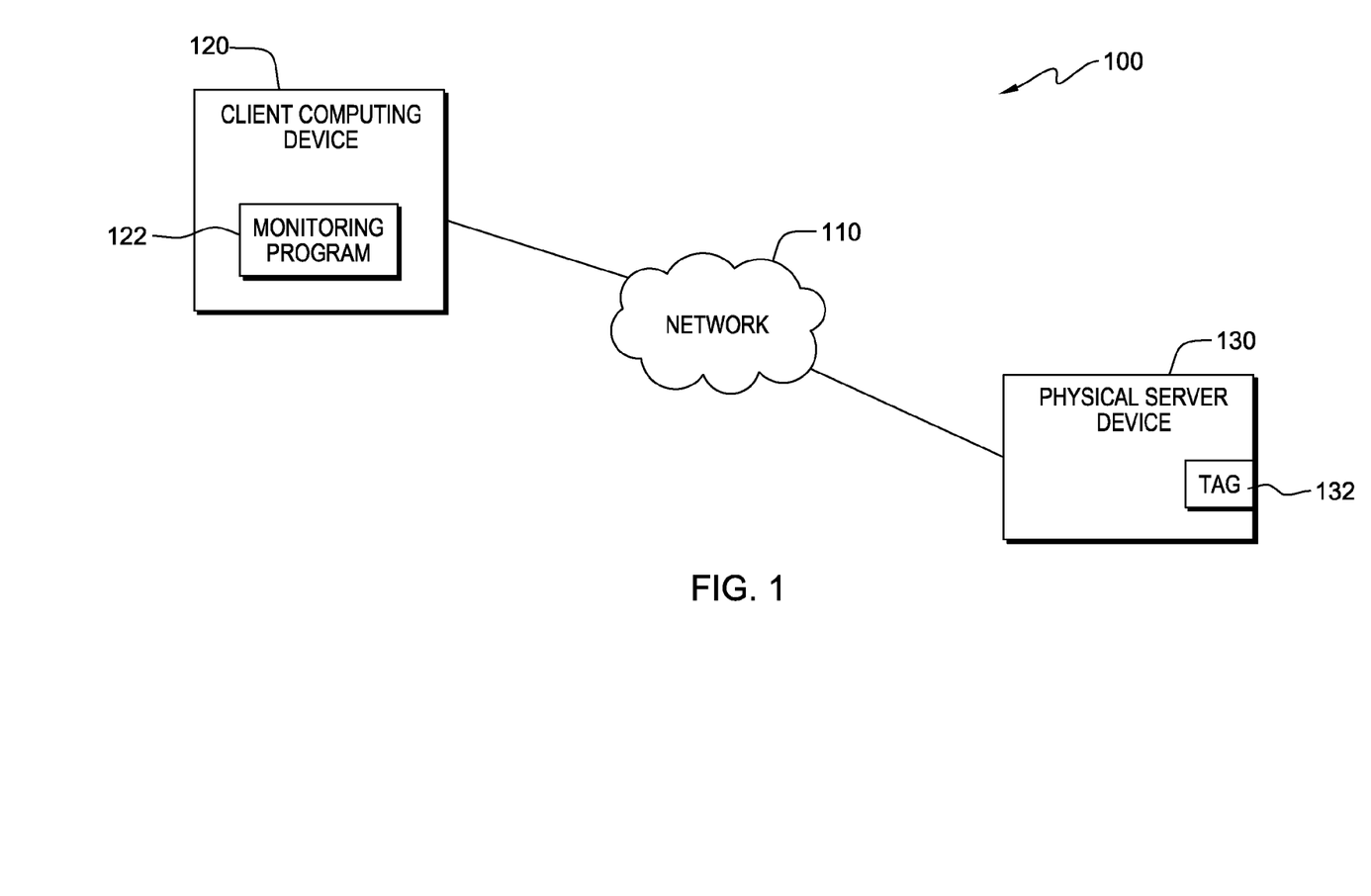
FIG. 1 is a functional block diagram illustrating a shared environment, in accordance with an embodiment of the present invention.

The present invention will now be described in detail with reference to the Figures. FIG. 1 is a functional block diagram illustrating a shared environment, generally designated 100, in accordance with one embodiment of the present invention.

Shared environment 100 includes a client computing device 120 and a physical server device 130, all interconnected over network 110. Network 110 can be, for example, a local area network (LAN), a wide area network (WAN) such as the Internet, or a combination of the two, and can include wired, wireless, or fiber optic connections. In general, network 110 can be any combination of connections and protocols that will support communications between client computing device 120 and physical server device 130.

Client computing device 120 includes monitoring program 122. In various embodiments of the present invention, client computing device 120 can be a laptop computer, a notebook computer, a personal computer (PC), a desktop computer, a tablet computer, a handheld computing device or smartphone, a thin client, or any other electronic device or computing system capable of executing machine-readable instructions and communicating through network 110. Client computing device 120 may include internal and external hardware component, as depicted and described in further detail with respect to FIG. 4.

In an exemplary embodiment of the present invention, monitoring program 122 allows a client operating on client computing device 120 to monitor the client's data within shared environment 100, including data, resources, and applications on physical server device 130 and the location of physical server device 130. Monitoring program 122 collects client information from shared environment 100, including location information for a physical server providing resources for the client's virtual machine and storage, such as physical server device 130, and creates a logical map of the client information and physical server locations. Location information for the physical server is provided by tracking a tag, such as a radio frequency identification (RFID) tag, attached to the physical server. The created logical map can be viewed by the client, providing a real time view of the client's shared environment, including shared data and shared infrastructure.

Monitoring program 122 can request a current location of the physical server, as determined from tracking the tag placed on the physical server, for example, tag 132 on physical server device 130. If the current location is different from the location of the physical server on the created logical map, monitoring program 122 verifies the change in location. Additionally, monitoring program 122 requests software data from the physical server in order to determine whether the software data is in compliance with predefined security and software requirements. If either the change in location is not verified or the software data is not in compliance, monitoring program 122 generates an alert indicating an issue. Otherwise, monitoring program 122 updates the client's logical map with the location change and the software data information.

In various embodiments of the present invention, physical server device 130 can be a laptop computer, a notebook computer, a personal computer (PC), a desktop computer, a tablet computer, or any other electronic device or computing system capable of providing virtual computing services, executing machine-readable instructions and communicating through network 110. In other various embodiments of the present invention, physical server device 130 may represent a computing system utilizing clustered computers and components to act as a single pool of seamless resources when accessed through a network. This is a common implementation for data centers and for cloud computing application. Tag 132 is connected, using known methods, to each physical server within shared environment 100, for example, physical server device 130. Tag 132 may be a RFID tag, or any other tag capable of being connected to a physical server and providing identification information when read. RFID tag identification information may include a tag serial number, or may include product-related information such as a stock number, lot or batch number, production date, or other specific information. In an exemplary embodiment of the present invention, a RFID tag has a serial number, which when connected to a physical server can be associated with the physical server. The associated RFID tag and physical server relationship can be stored within a shared environment data store. Additionally, the tag and physical server relationship can be added to existing asset management data storage. Physical server device 130 is described in further detail with reference to FIG. 2.

Figure 2:
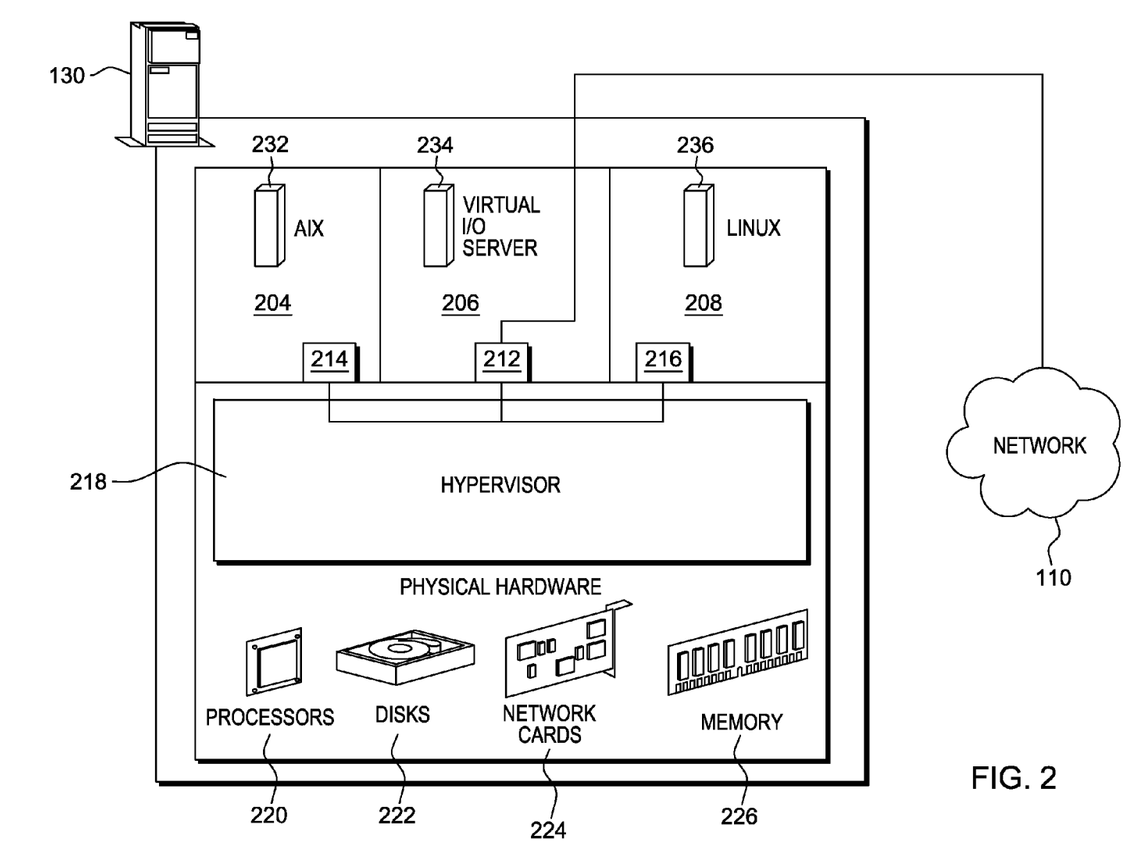
FIG. 2 illustrates a virtual computing system, such as the physical server device of FIG. 1, in accordance with an embodiment of the present invention.

FIG. 2 illustrates a virtual computing system, such as physical server device 130 of FIG. 1, in accordance with an embodiment of the present invention. Physical server device 130, located within shared environment 100, is divided into multiple logical partitions 204, 206, and 208. In an exemplary embodiment of the present invention, logical partitions 204, 206, and 208 each represent virtual machines provided to a client operating within shared environment 100, for example, a client operating client computing device 120, and using physical server device 130 as a physical host machine and using physical resources available on the physical server device 130. In the illustrated example, each of the respective logical partitions 204, 206, and 208 runs an independent operating environment, such as an operating system (OS). In an embodiment of the present invention, logical partition 204 runs an OS 232, which can be the AIX® operating system, logical partition 206 runs an OS 234, which can be a Virtual I/O Server (VIOS), and logical partition 208 runs an OS 236, which can be the Linux® operating system. Other operating environments and combinations of operating environments may be used. In various embodiments of the present invention, any number of partitions may be created and may exist in whole or in part on separate physical servers of a clustered computer system.

Communications from network 110 may be routed through Shared Ethernet Adapter (SEA) 212 on logical partition 206 to virtual adapters 214 and 216 on respective logical partitions 204 and 208. Communications from virtual adapters 214 and 216 on respective logical partitions 204 and 208 may be routed through SEA 212 on VIOS partition 206 to network 110. In an alternative embodiment of the present invention, physical network adapters may be allocated to logical partitions 204, 206, and 208.

Hypervisor 218 forms logical partitions 204, 206, and 208 from the physical resources of physical server device 130 through logical sharing of designated processors 220, storage disks 222, network cards 224, and/or memory 226 among logical partitions 204, 206, and 208. Hypervisor 218 performs operating system functions and manages communication between logical partitions 204, 206, and 208.

Figure 3:
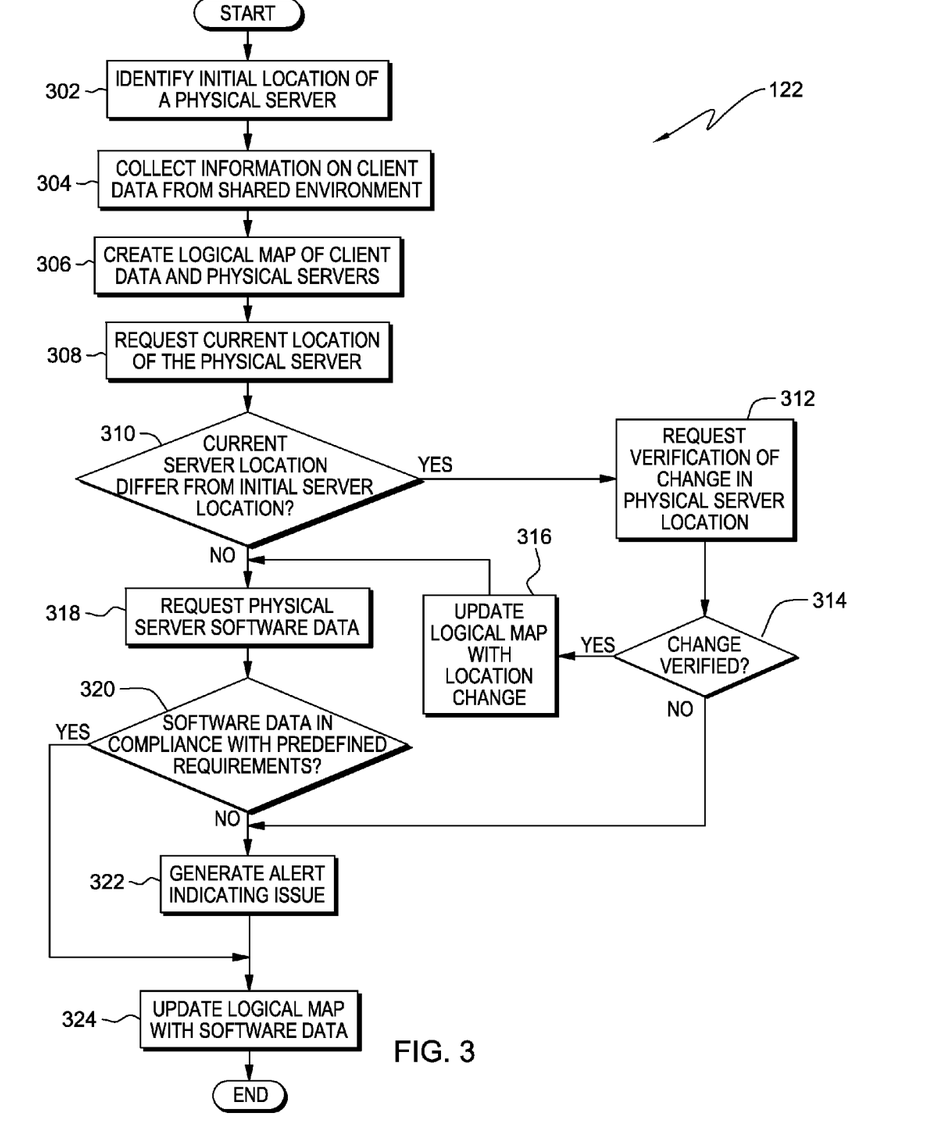
FIG. 3 is a flowchart depicting operational steps of a monitoring program for monitoring physical server location and client data in the shared environment of FIG. 1, in accordance with an embodiment of the present invention.

FIG. 3 is a flowchart depicting operational steps of monitoring program 122 for monitoring physical server location and client data in shared environment 100, in accordance with an embodiment of the present invention.

Monitoring program 122 identifies an initial location of a physical server (step 302). A tag, such as tag 132 on physical server device 130, is connected to each physical server within shared environment 100. Tag 132 contains information, such as a serial number, identifying a physical server associated with the tag. When read, through scanning or some other known tracking method, tag 132 allows the client to know the physical location of the associated physical server, for example, a building, a floor or a rack location. Tag 132 may also transmit information using a radio frequency signal.

Monitoring program 122 collects information on client data from a shared environment, such as shared environment 100 (step 304). Client data within shared environment 100 includes, for example, resources used by a client virtual machine, such as a host physical server or storage, server logs for each of the physical servers providing the resources, and software support information for the client data.

Monitoring program 122 creates a logical map of client data and physical server locations (step 306). Using information read or received from a tag, for example, tag 132, connected to each physical server, such as physical server device 130, and the collected information on client data from shared environment 100, monitoring program 122 can create a map showing the location of the physical server device hosting the client's virtual resources, including storage and processing resources, and information, storage, and data pertaining to and belonging to the client. The created logical map provides a base view of the client's virtual environment with respect to the physical environment.

Monitoring program 122 requests a current location of the physical server, for example, physical server device 130 (step 308). The tag connected to the physical server, tag 132 in shared environment 100, can be tracked or read to provide updated location information, for example, such as when physical server device 130 is moved within a data center. Monitoring program 122 determines whether the current server location differs from the initial, or first, server location in the logical map (decision block 310). If the current server location does not differ from the server location in the logical map (decision block 310, no branch), monitoring program 122 proceeds to request physical server software compliance data (step 318).

If the current server location differs from the initial server location (decision block 310, yes branch), monitoring program 122 requests verification of the change in physical server location (step 312). Verification can be provided from a cloud computing service provider, for example, a provider of virtual computing on physical server device 130, or a data center management provider. Verification provided can be, for example, if the physical server movement was authorized by a service ticket, such as a move for overall data center optimization and/or power utilization reasons, or the movement was a result of unplanned activity, such as a flood in the data center, and followed up with a post-action service ticket explaining to the client the physical server was re-located to preserve processing and data access, either within or to another data center. Verification, such as a service ticket, a post-action service ticket or some other notification, including an alert, a document, a report, a message, a receipt or a billing, can be attached to the client's logical map for viewing by the client or can be sent to the client.

Monitoring program 122 determines whether the change in physical server location was verified (decision block 314). If the change in physical server location was not verified (decision block 314, no branch), monitoring program 122 generates an alert indicating an issue (step 322). In an exemplary embodiment of the present invention, the alert may be sent to a client contact or administrator as part of an existing notification process and system.

If the change in physical server location was verified (decision block 314, yes branch), monitoring program 122 updates the logical map with the location change (step 316). Updating the logical map for the client provides a real time view of the client's shared environment within shared environment 100, including a physical location of a physical server within a data center.

In addition to verifying any change in physical server location, monitoring program 122 requests physical server software data (step 318). Software data can be provided for each physical server within a data center or shared environment, such as physical server device 130 in shared environment 100, and can include status information from a patch management system, enabling a client to verify the host operating systems and virtualization middleware are current and protected, or perform ongoing security health checks on physical servers, such as checking password policies, file permissions on critical files and evidence of an authorized software inventory. Software data may be stored, for example, within physical server device 130, or may be maintained by a data center management provider or a cloud computing services provider.

Monitoring program 122 determines whether the software data is in compliance with predefined requirements (decision block 320). In an exemplary embodiment of the present invention, software data compliance requirements are predefined and can be determined by a cloud computing service provider providing services for shared environment 100. In various other embodiments of the present invention, software data compliance requirements may be predefined, or predetermined, by the client. In various embodiments of the present invention, predefined software data compliance requirements may include requirements for provisioning virtual machines for certain clients on the most up to date physical servers, rather than on physical servers with a slower roll-out schedule for installing patches. Predefined compliance requirements may also include a schedule for security and software updates or checking password policies, required evidence of an authorized software inventory, or requirements for certain status information from a patch management system, so a client may see up to date security and software data. If the software data is not in compliance with predefined requirements (decision block 320, no branch), monitoring program 122 generates an alert indicating an issue (step 322). In an exemplary embodiment of the present invention, the alert may be sent to a client contact or administrator as part of an existing notification process and system.

If the software data is in compliance with predefined requirements (decision block 320, yes branch), monitoring program 122 updates the logical map with software data (step 324) to provide the client with real time information. In various embodiments of the present invention, monitoring program 122 may also request data from physical server access control systems, for example, access logs to the physical data center. The access logs can contain information on who accessed the entire data center, the server room, or the rack, and when the location was accessed. Access control system information may be included on the client's logical map providing the client with information on who accessed and when staff accessed the data center.

Figure 4:
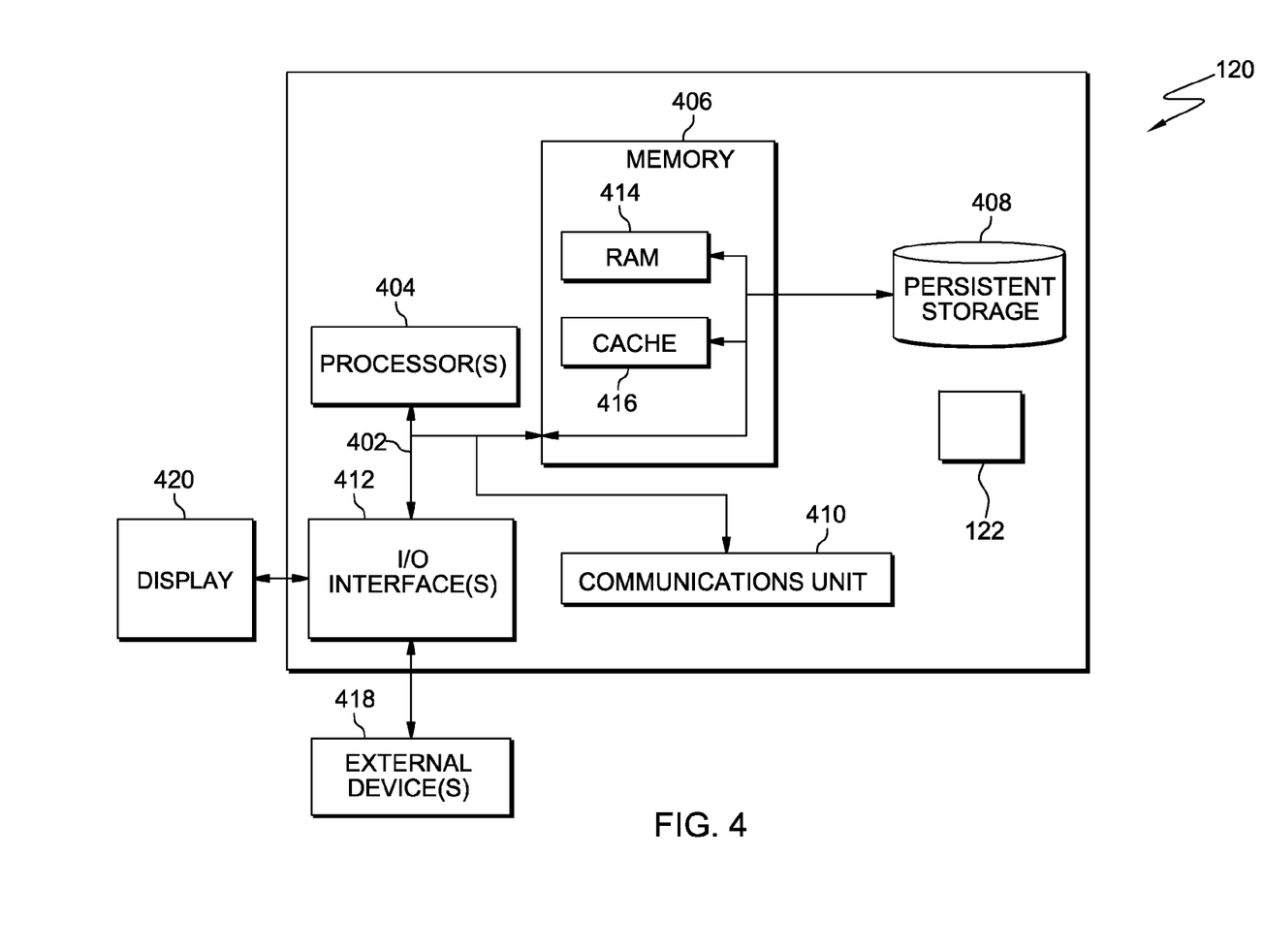
FIG. 4 depicts a block diagram of components of a data processing system, such as the client computing device of FIG. 1, in accordance with an embodiment of the present invention.

FIG. 4 depicts a block diagram of components of client computing device 120 in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Client computing device 120 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 414 and cache memory 416. In general, memory 406 can include any suitable volatile or non-volatile computer-readable storage media.

Monitoring program 122 is stored in persistent storage 408 for execution by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices, including physical server device 130. In these examples, communications unit 410 includes one or more network interface cards. Communications unit 410 may provide communications through the use of either or both physical and wireless communications links. Monitoring program 122 may be downloaded to persistent storage 408 through communications unit 410.

I/O interface(s) 412 allows for input and output of data with other devices that may be connected to client computing device 120. For example, I/O interface 412 may provide a connection to external devices 418 such as a keyboard, keypad, a touch screen, and/or some other suitable input device. External devices 418 can also include portable computer-readable storage media such as, for example, thumb drives, portable optical or magnetic disks, and memory cards. Software and data used to practice embodiments of the present invention, e.g., monitoring program 122, can be stored on such portable computer-readable storage media and can be loaded onto persistent storage 408 via I/O interface(s) 412. I/O interface(s) 412 also connect to a display 420. Display 420 provides a mechanism to display data to a user and may be, for example, a computer monitor or an incorporated display screen, such as is used in tablet computers and smart phones.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for monitoring client information within a shared environment, the method comprising:
   identifying, by one or more computer processors, a first physical location of a server computer, the server computer providing computing resources to a client within a shared environment;
   collecting, by the one or more computer processors, information associated with the client, wherein collected information includes computing resources of the server computer provided to the client;
   creating, by the one or more computer processors, a logical map showing the identified first physical location of the server computer and the collected information associated with the client, wherein the logical map provides the client with a real time view of a shared data environment of the client with respect to a shared infrastructure environment;
   identifying, by the one or more computer processors, a current physical location of the server computer;
   determining, by the one or more computer processors, whether the current physical location of the server computer is different than the first physical location of the server computer identified on the created logical map;
   in response to determining the current physical location of the server computer is different than the first physical location of the server computer identified on the created logical map,
   determining, by the one or more computer processors, whether the current physical location is a verified physical location for the server computer, wherein the verified physical location includes at least an authorized movement of the server computer; and
   responsive to determining the current physical location is not a verified physical location, generating, by the one or more computer processors, an alert indicating the current physical location is different than the first physical location of the server computer identified on the created logical map.

2. The method of claim 1, wherein identifying the first physical location of the server computer and identifying the current physical location of the server computer further comprise receiving, from a tag connected to the server computer, physical location information, wherein the physical location information includes one or more of a building, a floor, a room, and a rack location.

3. The method of claim 1, further comprising:
   receiving, by the one or more computer processors, software data for the server computer;
   determining, by the one or more computer processors, whether the software data is in compliance with predefined requirements;
   in response to determining the software data is not in compliance with predefined requirements, updating, by the one or more computer processors, the created map with the software data; and
   generating an alert indicating the software data is not in compliance with predefined requirements.

4. The method of claim 3, wherein requirements for compliance are predefined by the client or by a provider of the server computer.

5. The method of claim 1, wherein the computing resources of the server computer provided to the client include virtual computing resources and physical computer resources of the server computer.

6. The method of claim 1, wherein determining whether the current physical location is a verified physical location for the server computer further comprises receiving, by the one or more computer processors, a verification for the current physical location, wherein a verification includes one or more of: a service ticket, an alert, a report and a notification.

7. A computer program product for monitoring client information within a shared environment, the computer program product comprising:
   one or more computer-readable tangible storage devices and program instructions stored on the one or more computer-readable tangible storage devices, the program instructions comprising:
   program instructions to identify a first physical location of a server computer, the server computer providing computing resources to a client within a shared environment;
   program instructions to collect information associated with the client, wherein collected information includes computing resources of the server computer provided to the client;
   program instructions to create a logical map showing the identified first physical location of the server computer and the collected information associated with the client, wherein the logical map provides the client with a real time view of a shared data environment of the client with respect to a shared infrastructure environment;
   program instructions to identify a current physical location of the server computer;
   program instructions to determine whether the current physical location of the server computer is different than the first physical location of the server computer identified on the created logical map;
   in response to determining the current physical location of the server computer is different than the first physical location of the server computer identified on the created logical map,
   program instructions to determine whether the current physical location is a verified physical location for the server computer, wherein the verified physical location includes at least an authorized movement of the server computer; and responsive to determining the current physical location is not a verified physical location, program instructions to generate an alert indicating the current physical location is different than the first physical location of the server computer identified on the created logical map.

8. The computer program product of claim 7, wherein the program instructions to identify the first physical location of the server computer and the program instructions to identify the current physical location of the server computer further comprise program instructions to receive, from a tag attached to the server computer, physical location information, wherein the physical location information includes one or more of a building, a floor, a room, and a rack location.

9. The computer program product of claim 7, further comprising:
   program instructions to receive software data for the server computer;
   program instructions to determine whether the software data is in compliance with predefined requirements;
   in response to determining the software data is not in compliance with predefined requirements, program instructions to update the created map with the software data; and
   program instructions to generate an alert indicating the software data is not in compliance with predefined requirements.

10. The computer program product of claim 7, wherein the computing resources of the server computer provided to the client include virtual computing resources and physical computer resources of the server computer.

11. The computer program product of claim 7, wherein the program instructions to determining whether the current physical location is a verified physical location for the server computer further comprise program instructions to receive a verification for the current physical location, wherein a verification includes one or more of: a service ticket, an alert, a report and a notification.

12. A computer system for monitoring client information within a shared environment, the computer system comprising:
   one or more computer processors;
   one or more computer-readable tangible storage media;
   program instructions stored on the one or more computer-readable tangible storage media for execution by at least one of the one or more computer processors, the program instructions comprising:
   program instructions to identify a first physical location of a server computer, the server computer providing computing resources to a client within a shared environment;
   program instructions to collect information associated with the client, wherein collected information includes computing resources of the server computer provided to the client;
   program instructions to create a logical map showing the identified first physical location of the server computer and the collected information associated with the client, wherein the logical map provides the client with a real time view of a shared data environment of the client with respect to a shared infrastructure environment;
   program instructions to identify a current physical location of the server computer;
   program instructions to determine whether the current physical location of the server computer is different than the first physical location of the server computer identified on the created logical map;
   in response to determining the current physical location of the server computer is different than the first physical location of the server computer identified on the created logical map,
   program instructions to determine whether the current physical location is a verified physical location for the server computer, wherein the verified physical location includes at least an authorized movement of the server computer; and
   responsive to determining the current physical location is not a verified physical location, program instructions to generate an alert indicating the current physical location is different than the first physical location of the server computer identified on the created logical map.

13. The computer system of claim 12, wherein the program instructions to identify the first physical location of the server computer and the program instructions to identify the current physical location of the server computer further comprise program instructions to receive, from a tag attached to the server computer, physical location information, wherein the physical location information includes one or more of a building, a floor, a room, and a rack location.

14. The computer system of claim 12, further comprising:
   program instructions to receive software data for the server computer;
   program instructions to determine whether the software data is in compliance with predefined requirements;
   in response to determining the software data is not in compliance with predefined requirements, program instructions to update the created map with the software data; and
   program instructions to generate an alert indicating the software data is not in compliance with predefined requirements.

15. The computer system of claim 14, wherein requirements for compliance are predefined by the client or by a provider of the server computer.

16. The computer system of claim 12, wherein the computing resources of the server computer provided to the client include virtual computing resources and physical computer resources of the server computer.

17. The computer system of claim 12, wherein the program instructions to determining whether the current physical location is a verified physical location for the server computer further comprise program instructions to receive a verification for the current physical location, wherein a verification includes one or more of: a service ticket, an alert, a report and a notification.

* * * * *